United States Patent Office 3,671,145
Patented June 20, 1972

3,671,145
IMPROVEMENTS IN OR RELATING TO BEARINGS
Frederick William Walton Morley, Derby, and Wilfred
Thomas Watts, Edgware, England, assignors to Rolls-
Royce Limited, Derby, England
Filed Aug. 18, 1970, Ser. No. 64,789
Claims priority, application Great Britain, Sept. 2, 1969,
43,325/69
Int. Cl. F04b 3/00, 5/00, 25/00; F16c 17/16
U.S. Cl. 417—247
7 Claims

ABSTRACT OF THE DISCLOSURE

An inter-shaft bearing assembly for a multi-shaft gas turbine engine comprising a coaxial arrangement of an inner shaft mounted within a hollow outer shaft for relative rotation between the shafts with a sleeve disposed between the shafts and drivingly engaged by the outer shaft. The sleeve has a bearing surface which co-operates with a bearing surface on the inner shaft. Two annular projections on the sleeve disposed one each side of the bearing surface project radially inwardly thereof so that in operation oil which is supplied to the bearing surfaces is retained on the surfaces by the projections.

---

The invention relates to an assembly and more specifically to an inter-shaft bearing.

A rotatable bearing assembly comprising a coaxial arrangement of an outer hollow shaft, an inner shaft mounted within the outer shaft for relative rotation between said shafts and a sleeve disposed between said shafts, engagement means for driving the sleeve with the outer shaft, a bearing surface on the sleeve, two annular projections on the sleeve disposed one each side of said bearing surface and both projecting radially inwardly thereof, a bearing surface on the inner shaft arranged to co-operate with the bearing surface on the sleeve, means for supplying oil to said bearing surfaces, the arrangement being such that oil supplied to said bearing surfaces is retained in operation on said surfaces by said projections.

To facilitate assembly the sleeve is split longitudinally into two or more parts and is held clamped around the inner shaft by springs.

The means for drivingly engaging the sleeve with one of the shafts preferably comprises a pin protruding from the bore of the outer shaft and engaging the sleeve.

Preferably the pin engages with an axially extending slot in one end portion of the sleeve, the slot being provided with a tapered entry.

A further preferred feature of the sleeve is that is comprises at least two axially spaced bearing portions.

According to the invention there is provided an assembly comprising concentric inner and outer shafts and a bearing sleeve arranged to be mounted in or on one of said shafts prior to concentric assembly of said shafts, and means for drivingly engaging said sleeve with the other of said shafts when the shafts are mounted concentrically so that the sleeve provides bearing contact with said one shaft.

In a further preferred embodiment of the invention the inner and outer shafts are shafts of a gas-turbine engine with the sleeve disposed therebetween.

Preferably the outer shaft is the low-pressure turbine shaft of the gas turbine engine, the inner shaft is the power-turbine shaft and the sleeve is a journal bearing between the shafts.

Figure 1:
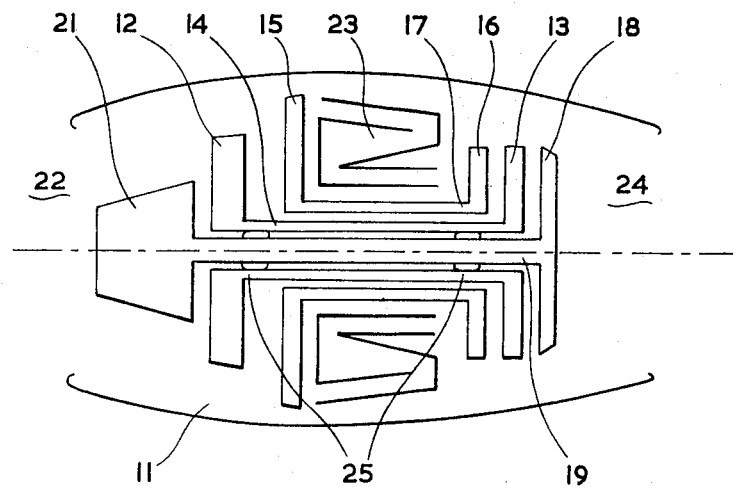
Figure 2:
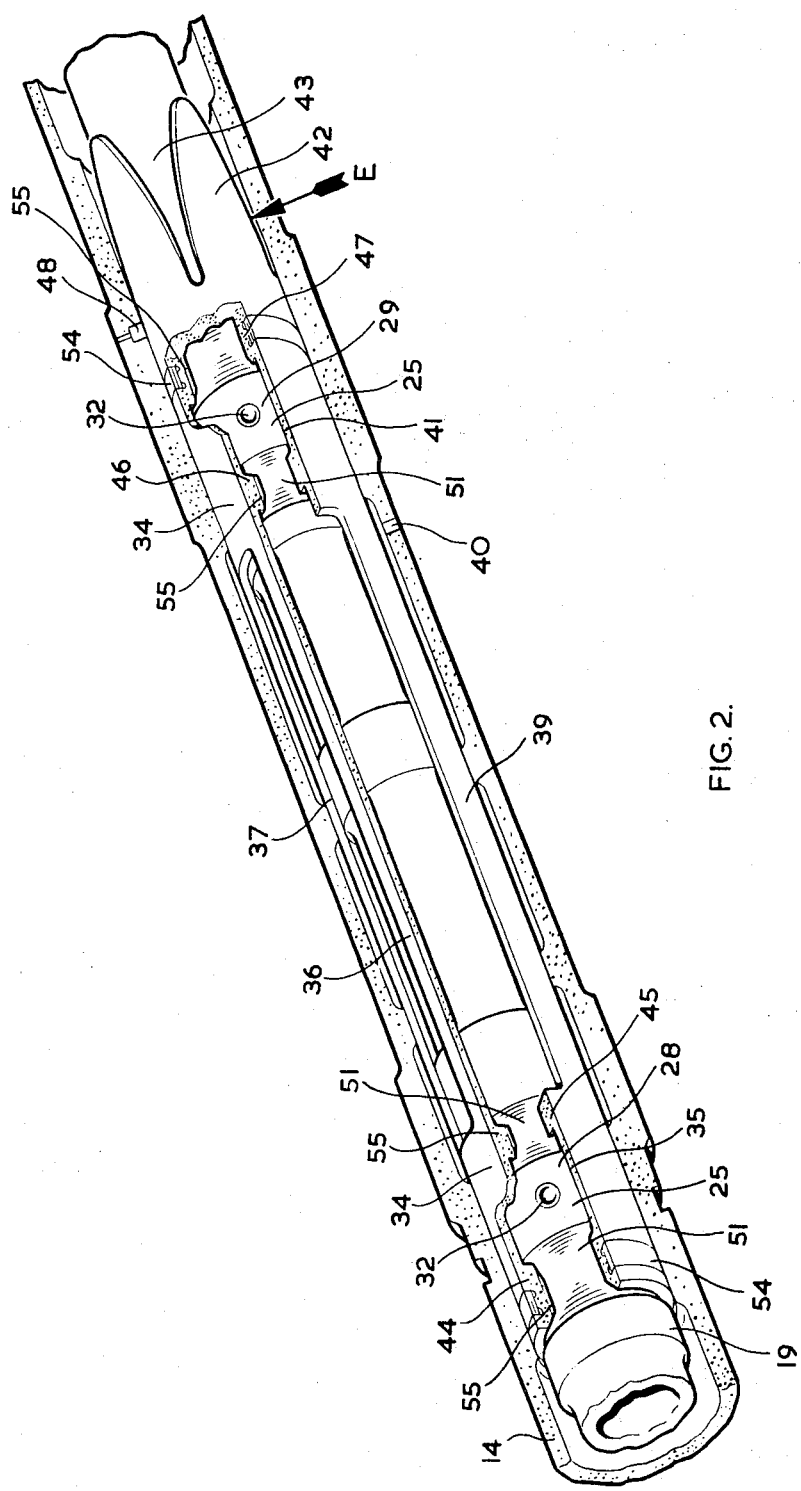
Figure 3:
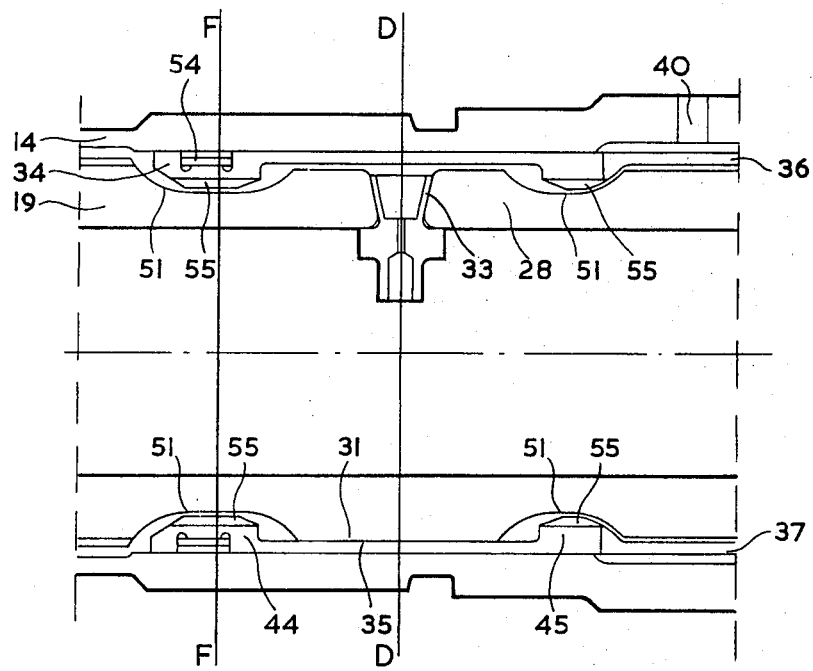
Figure 5:
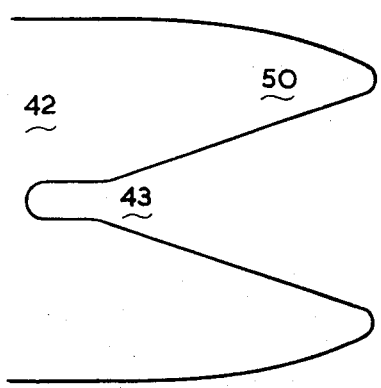
Figure 6:
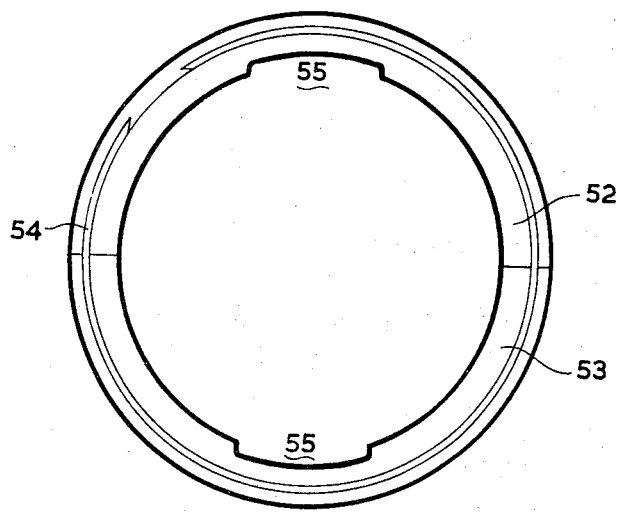
Figure 4:
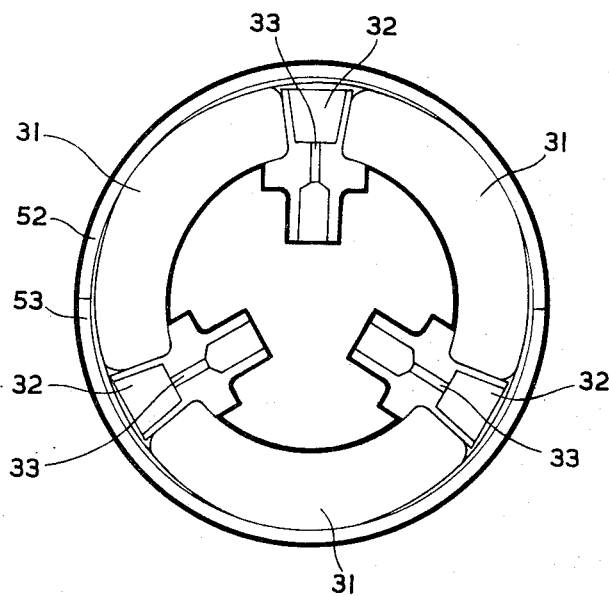

An embodiment of the invention will now be described, by way of example only, with reference to the accompanying drawings in which:

FIG. 1 is a diagrammatic representation of a gas turbine engine of the multi-shaft type.
FIG. 2 is a pictorial view of a plain bearing arrangement in FIG. 1.
FIG. 3 is a section along the axis of part of the bearing assembly.
FIG. 4 is a part view on section D—D of FIG. 3.
FIG. 5 is a part view in the direction of arrow E in FIG. 2.
FIG. 6 is a part view on section F—F of FIG. 3.

In FIG. 1 a gas turbine engine 11 comprises a low-pressure compressure 12 driven by a low-pressure turbine 13 through a hollow shaft 14, a high-pressure compressor 15 driven by a high-pressure turbine 16 through a hollow shaft 17, and a power turbine 18 driving a rotor system (not shown) through a hollow shaft 19 and a speed reduction gearbox 21. The gas turbine engine also comprises an air intake 22, a combustion system 23 and an exhaust duct 24. The hollow shafts 14, 17 and 19 are co-axial and rotate independently of each other.

Various bearing arrangements are provided for supporting the various rotating parts of the engine and one such bearing arrangement is indicated at 25 in FIG. 1 and is shown in FIG. 3. The bearing arrangement 25 shown in FIGS. 2 and 3 between the power turbine shaft 19 and the low-pressure turbine shaft 14 is designed to run in an oil-flooded condition, as will be described later, and to have a stabilising and centring action on the power turbine shaft.

The outer diameter of the power turbine shaft 19 has been machined at two portions, 28 and 29 (see FIG. 2), along its length to produce at each portion three lobes 31 equiangularly spaced around the circumference of the shaft. The lobes 31 (see FIG. 4) are sectors of the surface of the base cylinder of the power turbine shaft and between each lobe the surface of the power turbine shaft is recessed along a radius which is greater than the radius of the base cylinder to form a convex surface, viewed from the centre of the shaft, which blends with the adjacent lobe surfaces.

The portions 28 and 29 of the power turbine shaft form the journals of the plain bearing arrangement 25 and are mounted for rotation in journal bearings 35 and 41. At each of the portions 28 and 29 three ports 32 have been drilled through the wall of the power turbine shaft the ports being equiangularly spaced around the shaft and between the lobes 31. Into each port is fixed an oil jet 33.

In operation, oil supplied through the centre of the power turbine shaft meters through the oil jets 33 into the spaces between the lobes 31 and the journal bearing and with the relative rotation of the shafts the oil is forced between the converging lobes and the bore of the journal bearing.

The plain bearing arrangement 25 also includes a sleeve 34 which comprises journal bearings 35 and 41 rigidly connected together by four webs 36, 37, 38 and 39. The journal bearing 35 has an annular weir 44 projecting inwards from the bore at one end and an annular weir 45 projecting inwards from the bore at the other end. Similarly the journal bearing 41 has annular weirs 46 and 47 projecting inwards at its ends. The annular weirs 44, 45, 46 and 47 extend into arcuate grooves 51 cut into the power turbine shaft.

Oil flows out from the sides of the bearing and due to the centrifugal effect it is trapped by the annular weirs until the level of oil is sufficient to overflow the annular weirs. Thus the annular weirs ensure that the plain bearing runs in an oil flooded condition. Further, when the engine is shut down sufficient oil is retained in the lowermost part of the weir to provide initial lubrication on restarting.

The assembly of the bearing arrangement and the locating of this assembly within the low-pressure shaft will now be descrbied with reference to FIGS. 2, 3, 4, 5 and 6. The sleeve 34 is split longitudinally into two halves before the machining of the bore. The two halves 52 and 53 of the sleeve 34 are butted together round the power turbine shaft 19 such that journal bearing portions 35 and 41 of the sleeve are positioned correctly in relation to the journal portions 28 and 29 respectively. The two halves 52 and 53 of the sleeve 34 are held in position by two C springs 54. The sleeve and power turbine shaft assembly is then inserted into the low-pressure turbine shaft 14 from the left-hand side in FIG. 2 until an external flange projecting from the outer race of a thrust bearing (not shown) which is mounted on the power turbine shaft abuts an anchoring point on the engine and prevents any further insertion of the sleeve and power turbine shaft assembly into the low-pressure turbine shaft. A cylinder 42 which projects from the right-hand end of the journal bearing 41 (see FIG. 2) has four slots 43 (see FIG. 5), the slots are equiangularly disposed round the cylinder 42 and are positioned circumferentially offset from the webs 36, 37, 38 and 39 so that when the low-pressure turbine shaft, the bearing assembly and the power turbine shaft are fitted together the said webs of the sleeve 34 do not cover oil ports 40 in the low-pressure turbine shaft. During the assembly a pin 48 projecting inwards from the bore of the low-pressure shaft engages in one of the slots 43 and ensures that in operation the sleeve 34 rotates with the low-pressure shaft 14. There is a gap left between the pin 48 and the bottom of the slot 43 so that the pin 48 plays no part in the axial location of the sleeve 34 in operation. If during the assembly the pin 48 butts against the tip of an arm 50 of the cylinder 42 between two slots 43 then the assembly is withdrawn from the low-pressure shaft, revolved through a few degrees and re-inserted into the low-pressure shaft when the pin 48 will engage in a slot 43. The fit of the sleeve 34 in the low-pressure shaft is as close a fit as is compatible with the assembly. The fit of the lobed shaft in the journal bearing is a standard bearing fit.

The top face and outside face of each of the annular weirs 45 and 46 is rounded with a radius equal in dimension to the radius of the corresponding arcuate slots 51 and each acts as a thrust face for the axial location of the sleeve 34 with respect to the power turbine shaft.

Two slots 55 are cut, diametrically opposite each other, in the top of each annular weir (see FIGS. 3 and 6). The depth of each slot is such that the annular weir still functions to keep the bearing surfaces of the bearing assembly in an oil-flooded condition. The purpose of the slots is to allow a sufficient rate of flow of oil through the bearing assembly for the oil to cool the bearing. It will be noted that when one of the thrust faces of the annular weirs 45 and 46 contacts the side of the groove 51 oil can still flow through the slot 55.

What we claim as our invention and desired to secure by Letters Patent is:

1. A rotatable bearing assembly comprising a co-axial arrangement of a rotatable outer hollow shaft, a rotatable inner shaft mounted within the outer shaft for relative rotation between said shafts and a longitudinally-split sleeve disposed between said shafts, engagement means for driving the sleeve with the outer shaft, a bearing surface on the sleeve, two annular projections on the sleeve disposed one each side of said bearing surface and both projecting radially inwardly thereof, a bearing surface on the inner shaft arranged to co-operate with the bearing surface on the sleeve, spring means extending around the longitudinally-split sleeve to hold the sleeve around the inner shaft with the annular projections on the sleeve either side of the bearing surface on the inner shaft to limit axial movement of the sleeve relative to the inner shaft, means for supplying oil to said bearing surfaces, the arrangement being such that oil supplied to said bearing surfaces is retained in operation on said surfaces by said projections.

2. A rotatable bearing assembly as claimed in claim 1 in which the means for drivingly engaging the sleeve with the outer shaft comprises a pin protruding from the bore of the outer shaft and engaging with an axially extending slot in one end portion of the sleeve, the slot being provided with a tapered entry.

3. A rotatable bearing assembly as claimed in claim 1 in which the inner shaft is provided with circumferential grooves disposed one each side of the bearing surface and into which project the projections from the sleeve.

4. A rotatable bearing assembly as claimed in claim 1 in which the sleeve and the inner shaft comprises at least two axially spaced co-operating bearing portions.

5. A rotatable bearing assembly as claimed in claim 1 in which lobes are formed on the bearing surface of the inner shaft.

6. A rotatable bearing assembly as claimed in claim 1 in which each projection is provided at its periphery with an axially extending slot of a radial depth such that in operation the projection retains oil on the bearing surface whilst allowing a flow of oil through the bearing assembly.

7. A gas turbine engine comprising a rotatable bearing assembly as claimed in claim 1.

References Cited
UNITED STATES PATENTS 1,132,949   3/1915   McAdams ---------- 308—109

MARTIN P. SCHWADRON, Primary Examiner

F. SUSKO, Assistant Examiner

U.S. Cl. X.R.

308—9